United States Patent [19]
Boyle et al.

[11] Patent Number: 6,118,870
[45] Date of Patent: Sep. 12, 2000

[54] MICROPROCESSOR HAVING INSTRUCTION SET EXTENSIONS FOR DECRYPTION AND MULTIMEDIA APPLICATIONS

[75] Inventors: Douglas B. Boyle, Palo Alto; Michael D. Rostoker, Boulder Creek, both of Calif.

[73] Assignee: LSI Logic Corp., Milpitas, Calif.

[21] Appl. No.: 08/723,474

[22] Filed: Oct. 9, 1996

[51] Int. Cl.[7] .................................. H04L 9/00; H04L 9/06
[52] U.S. Cl. ......................... 380/201; 380/200; 713/182; 713/189; 713/193; 713/200; 713/201; 345/202; 364/715.02; 382/166; 382/232
[58] Field of Search .................................. 380/4, 9, 21, 23, 380/25, 29, 49, 50, 59, 42, 30, 5; 345/202; 348/439, 568; 352/84; 358/426; 364/715.02; 370/202, 521; 382/166, 232, 233; 395/114, 888; 455/72; 707/101; 713/182, 189, 193, 200, 201

[56] References Cited

U.S. PATENT DOCUMENTS

| | | | |
|---|---|---|---|
| 4,386,416 | 5/1983 | Giltner et al. | 380/49 X |
| 4,454,575 | 6/1984 | Bushaw et al. | 380/49 X |
| 4,991,169 | 2/1991 | Davis et al. | 370/77 |
| 5,307,413 | 4/1994 | Denzer | 380/49 |
| 5,396,228 | 3/1995 | Garahi | 380/42 X |
| 5,479,512 | 12/1995 | Weiss | 380/9 X |
| 5,499,293 | 3/1996 | Behram et al. | 380/4 |

*Primary Examiner*—Bernarr E. Gregory

[57] ABSTRACT

A subscriber station for decrypting and decompressing data is provided on a single chip. The chip includes a DES decryption unit for performing decryption of incoming data with a DES key, a public key decryption unit for decrypting the DES key, a general purpose microprocessor for performing decompression, and a Secure Buffer for protecting the decrypted data prior to decompression. The chip includes an embedded key for the public key decryption unit and a bus for providing a data communication path between the microprocessor and the decryption units.

23 Claims, 4 Drawing Sheets

MICROPROCESSOR HAVING INSTRUCTION SET EXTENSIONS FOR DECRYPTION AND MULTIMEDIA APPLICATIONS

BACKGROUND OF THE INVENTION

The invention relates to digital communications. The invention also relates to data encryption and data compression.

Use of the airwaves for digital communications is increasing rapidly. Cellular telephones have become widely accepted for voice communications and continue to grow in popularity. Very Small Aperture Terminals (VSATs), with their 24" dish antennae, are increasingly being used for distributing software. Even smaller (18 inch) dish antennae, coupled with integrated receiver/decoder units, are being used for receiving digital television signals. Soon, all portable computers will be equipped with wireless modems for transmitting data over the airwaves.

Security and piracy are of great concern whenever data is transmitted over the airwaves, or any other public access medium. It is relatively simple to intercept a digital signal and steal the information being transmitted.

Security is of special concern to those people conducting business over public access media. Care must be taken to protect credit card numbers, engineering drawings, business letters, access codes and other types of confidential information.

Piracy is of special concern to software and multimedia developers and publishers. Piracy, involving the unauthorized copying and distribution of copyrighted software and multimedia content, robs the software developers of their time, money and energy in creating their software. Piracy also robs the publishers of their money spent in preparing the software for distribution. Uncompressed software files, especially multimedia files, are typically too large to be distributed in any practical manner. A large part of the cost of preparation is devoted to compressing the video and audio data for distribution and storage. Software pirates can bypass this cost.

Security can be provided, and piracy thwarted, by encrypting data prior to transmission and decrypting the transmitted data following transmission. Two well known encryption/decryption techniques are RSA and DES. Both techniques involve the use of encryption/decryption keys. RSA uses two keys: a public key for encryption and a private key for decryption. DES uses a single key for encryption and decryption.

Problems exist with the encryption and decryption of data. If a private key or a DES key is published, the security of the system is defeated. A subscriber might not intend to publish the key, but might do so inadvertently. A less innocent scenario can arise if an unauthorized user logs onto the computer and learns the key. Yet another scenario can arise when a computer is receiving a download over the Internet. The party making the download might make an unauthorized side trip into the host computer's hard drive and access data, including the encryption key.

In addition, hardware for encryption/decryption does not protect compressed software. Dedicated decryption chips decrypt the transmissions and provide the compressed data to a decoder or decompression system, but offer no protection for the compressed data. Because compressed data holds greater value than uncompressed data, pirates have great incentive to pirate the compressed data.

Therefore, an objective of the present invention is to protect compressed data from being pirated.

A further objective of the present invention is to increase security of data transmissions.

Another objective of the present invention is to ensure the integrity of software running on a computer participating in transactions with a server, such as in financial transactions.

SUMMARY OF THE INVENTION

This objective is achieved by a method and apparatus according to the present invention. According to the present invention, there is provided a subscriber station for processing incoming data that has been encrypted and compressed. The subscriber station comprises means for decrypting the incoming data, a Secure Buffer for storing the decrypted, compressed data from the decryption means, and decompression means for decompressing the data in the Secure Buffer. The compressed data is accessible only to the decompression means when decompression is being performed.

The decompression means may include a CISC-based or RISC-based general purpose microprocessor. The microprocessor is provided with multimedia instruction set extensions for performing the decompression.

The subscriber station may also comprise security instruction set extensions for performing decryption.

The decompression means of the subscriber station may include a central processing unit that is programmable with a decompression program to decompress the data in the Secure Buffer, and the decompression program may also be stored in the Secure Buffer.

The decryption means of the subscriber station may include a public key decryption unit and memory for storing a private key for the public key decryption unit, the key being embedded in the memory. The decryption means may further include a DES decryption unit for decrypting the incoming data, wherein the public key decryption unit decrypts an encrypted DES key that comes to the subscriber station prior to the incoming data. In such a situation, the central processing unit is programmed with a start-up program that instructs the central processing unit, to decrypt the DES key, load the DES key into the DES decryption unit, decrypt the decompression program and store the decrypted decompression program in the Secure Buffer, and execute the decompression program stored in the Secure Buffer.

The subscriber station may also comprise a load register for the Secure Buffer. The load register is accessible only to the decryption means when decryption is being performed. Further, the load register is accessible only to the decompression means when decompression is being performed.

Alternately, the invention comprises a digital communications system comprising a publisher station for transmitting data over a communications link and a subscriber station for receiving the data on the communications link. The data includes an encrypted decompression program, an encrypted DES key and at least one encrypted, compressed file. The subscriber station comprises decryption means for decrypting the decompression program, the DES key and the at least one file. The subscriber station also comprises a Secure Buffer for storing the decrypted files and a general purpose microprocessor for decompressing the files in the Secure Buffer. Again, files in the Secure Buffer are accessible only to the microprocessor when decompression is being performed.

Other objects, features, and advantages of the present invention will become more apparent from a consideration

DETAILED DESCRIPTION OF THE PREFERRED EMBODIMENTS

Figure 1:
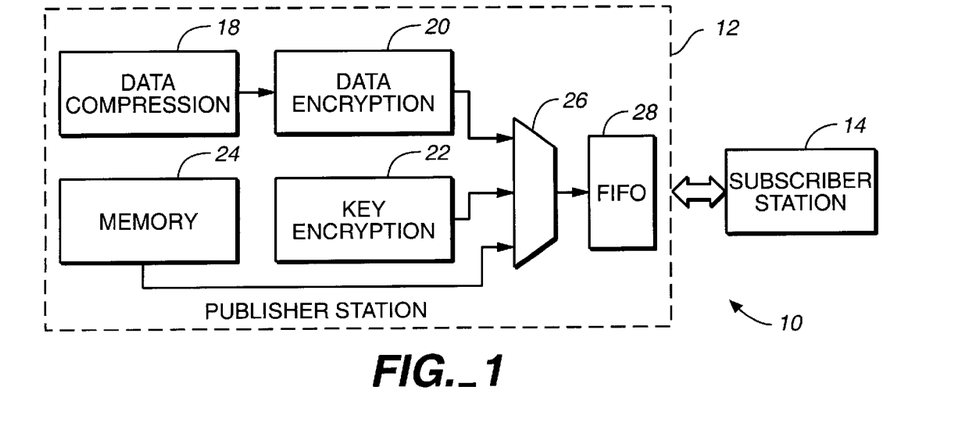
FIG. 1 is a block diagram of a digital communications system according to the present invention.

FIG. 1 shows a digital communications system 10 including a publisher station 12 and a subscriber station 14. A communication link 16 allows for bidirectional communications between the publisher station 12 and the subscriber station 14. Although only one subscriber station is shown, the publisher station 12 can communicate with many subscriber stations 14 over the communications link 16. Similarly, the subscriber station 14 can communicate with many publisher stations 12 over the communications link 16. The communication link 16 could include, for example, a wireless transceiver for the publisher station 12 and a wireless transceiver for the subscriber station 14. The general construction and operation of the communication link 16 is well known and will not be described in any further detail.

The publisher station 12, which will now be described, includes a data compression module 18 for compressing data according to a compression algorithm. The algorithm used for compression depends upon the type of data being transmitted. Multimedia or video-only data might be compressed according to an MPEG algorithm, either MPEG-1 or MPEG-2. Still-frame video data might be compressed according to a JPEG or GIF algorithm. Audio-only data might be compressed according to an MPEG or Dolby-AC3 algorithm. The compression module 18 includes a microprocessor that could be programmed to perform any one of these algorithms. Or, the microprocessor could be programmed to perform several or all of these algorithms, with the appropriate algorithm being selected by the publisher. These compression algorithms are well known, and their implementation will not be discussed in any further detail.

The publisher station 12 also includes a data encryption module 20, which encrypts data according to an encryption algorithm. The encryption algorithm could be a public key algorithm such as RSA or a private key algorithm such as DES. DES is a symmetric encryption algorithm, using the same algorithm and key for encryption and decryption. A 56-bit DES key is used to encrypt 64-bit blocks of plaintext into 64-blocks of ciphertext and back to the 64-bit blocks of plaintext. DES is preferred because it is several orders of magnitude faster than the RSA algorithm and is therefore more practical for encrypting large volumes of data for transmission.

The publisher station 12 includes a key encryption module 22 for encrypting the DES key before the key is sent to the subscriber station 14. The DES key is needed by the subscriber station 14 to decrypt the data. A public key encryption algorithm such as RSA is used for encrypting the DES key. The key encryption module 22 accesses a public key from the subscriber 14 unit over the communication link 16 and encrypts the DES key according to the public key algorithm.

The publisher station 12 further includes electronic memory 24 for storing two executable programs that facilitate the secure transmission of the compressed data: a U-LOAD program and an EPLAY program. The publisher station 12 sends the U-LOAD program, unencrypted and uncompressed, to the subscriber station 14 for execution. The U-LOAD program enables the subscriber station to load the DES key and the EPLAY program. The publisher station 12 sends the EPLAY program, encrypted but not compressed, to the subscriber station 14 for decompressing subsequent data on the communications link 16.

The publisher station 12 and the subscriber station 14 can communicate using the HTTP protocols of the World Wide Web (WWW) over the Internet 62. The user at the subscriber station first requests the U-LOAD program, using the HTTP protocols by using a WWW browser program. The publisher station, acting as a WWW server, sends the U-LOAD program to the subscriber station 14, which stores it in the memory 60. The user then executes the U-LOAD program, which requests the encrypted DES key and the encrypted EPLAY program, using HTTP, FTP or other protocols and stores them in the memory 60. After the system has loaded the EPLAY program, the subscriber station 14 is ready to decrypt and decompress the multimedia data. The multimedia data can be distributed over the Internet 62, on media such as CD-ROM, DVD, or DAT, or broadcast using terrestrial or satellite channels or cable.

Figure 2:
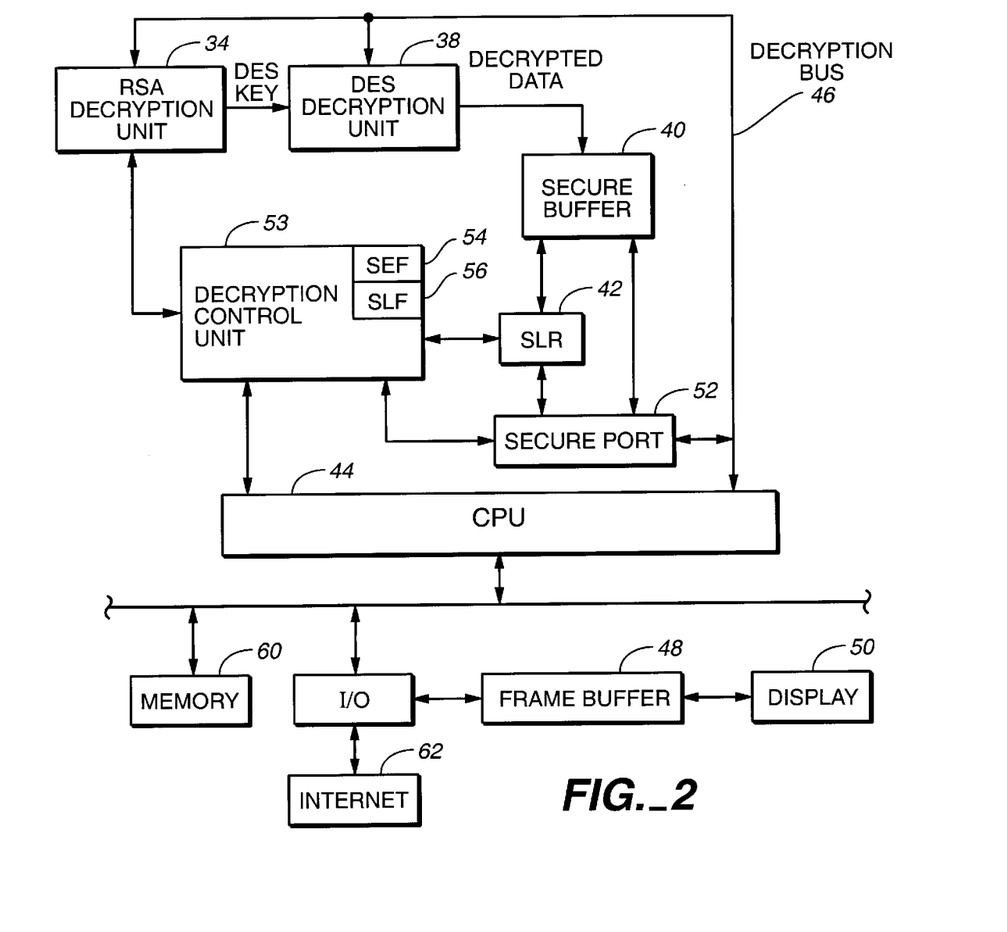
FIG. 2 is a block diagram of a subscriber station, which forms a part of the system shown in FIG. 1.

FIG. 2 shows the details of the subscriber station 14. The encrypted key is supplied directly to an RSA decryption unit 34, which uses its private key to decrypt the encrypted DES key. Any well known architecture for the RSA decryption unit 34 can be used.

See, for example, a description of a hardware implementation of the RSA decryption unit 34 by E. F. Brickell in "Survey of Hardware Implementations of RSA," Advances in Cryptology-CRYPTO '89 Proceedings, Springer-Verlag, 1990, pp. 368–370.

The private key for the RSA decryption unit 34 is stored in non-volatile read-only memory 36 such as EPROM or Flash RAM. The public key can be made accessible through key management and authentication software.

The private key is stored in the memory 36 at a location that can be read only by the RSA decryption unit 34. This prevents the subscriber and all other users, whether authorized or not, from learning the private key.

The RSA decryption unit 34 supplies the decrypted DES key to a DES decryption unit 38. The DES decryption unit 38 uses the DES key to decrypt the EPLAY program and the encrypted, compressed data from the demultiplexer 32. Once used, the decrypted DES key is erased from memory to prevent unauthorized access. Any well known architecture for the DES decryption unit 38 can be used. See, for example, a description of a hardware implementation of the DES decryption unit 38 by H. Eberle in "A High-Speed DES Implementation for Network Applications," Advances in Cryptology-CRYPTO '92 Proceedings, Springer-Verlag, pp. 521–539.

The decrypted EPLAY program and the decrypted (still compressed) data are stored in a Secure Buffer 40. A Secure Load Register 42 stores read and write pointers for read and write operations to the Secure Buffer 40.

The unencrypted, uncompressed U-LOAD program is LOADED INTO THE MEMORY 60 FOR EXECUTION BY THE Central Processor Unit (CPU) 44. The U-LOAD program instructs the CPU 44 to load the private key from the memory 36 into the RSA decryption unit 34 and to load the decrypted DES key into the DES decryption unit 38. Then, the U-LOAD program instructs the CPU 44 to run the DES decryption unit 38 and load the decrypted data into the Secure Buffer 40. The CPU 44 reads the encrypted EPLAY program from the memory 60 and writes it into the DES decryption unit 38 over the decryption bus 46. The ULOAD program then instructs the CPU to enter Secure Execution mode program and begin execution of the EPLAY program.

The architecture of the CPU 44 can be CISC-based or RISC-based. An architecture for a CISC-based CPU 44 could be based on Intel's "Pentium" processor. An architecture for a RISC-based CPU 44 could be based on a "Power PC" processor. However, the regular instruction sets and architectures for CISC-based processors such as the "Pentium" processor and RISC-based processors such as the "Power-PC" do not provide mechanisms for protecting secret keys or decrypted data. Therefore, the CPU 44 is enabled with a decryption instruction set extension. Decryption instructions, which form a part of the decryption instruction set extension, instruct the CPU 44 to load the encrypted DES key into the RSA decryption unit 34 for decryption, load the decrypted DES key into the DES decryption unit 38, run the DES decryption unit 38 and load the decrypted data into the Secure Buffer 40. The following exemplary instructions could form a part of the Decryption instruction set extension.

lrsa Load the RSA decryption unit 34. Typically, an lrsa instruction is executed to load a 64-bit block of data into the RSA decryption unit 34.

drsa Run the RSA decryption unit 34 and load the decrypted DES key into DES decryption unit 38. Reset the Secure Load Register 42 to address zero of the Secure Buffer 40, and clear the Secure Load Flag.

ddes Run the DES decryption unit 38, write the decrypted data into the Secure Buffer 40 at the location specified by the Secure Load Register 42, and increment the Secure Load Register 42. When the Secure Load Register 42 reaches the last addresses of the Secure Buffer 40, the Secure Load Flag is set, indicating that loading of the Secure Buffer 40 is complete.

bsem Begin the "Secure Execution" mode. This instruction is illegal unless the Secure Load Register 42 is set. Interrupts are masked, the Secure Execution Flag is set, and instruction fetch begins at location zero of the Secure Buffer 40.

esem End the Secure Execution mode and clear the Secure Execution Flag.

The Decryption Control Unit 53 execute the decryption instructions and controls the RSA decryption unit 34, the DES decryption unit 38, the Secure Load Register (SLR) 42, and the Secure Execution Flag (SEF) 54, the Secure Load Flag (SLF) 56, and the Secure Port 52. The CPU can use the Decryption Bus 46 to load the encrypted DES key into the RSA decryption unit 34 and to load the encrypted EPLAY program and multimedia data into the DES decryption unit 38. The decrypted DES key is transferred from the RSA decryption unit 34 to the DES decryption unit 38 over a private bus. The decrypted EPLAY program and multimedia data is transferred from the DES decryption unit 38 to the Secure Buffer 40 over a private bus. The SLR 42 specifies the address in the Secure Buffer 40 into which the decrypted data is written. As the DES decryption unit 38 writes each data item, the SLR 42 is incremented by the Decryption Control Unit 53. When the CPU is in Secure Execution mode, the Secure Port 52 is enabled and the CPU can use the Decryption Bus 46 to access the SLR 42 and the Secure Buffer 40.

The EPLAY program controls the decryption and the decompression of the multimedia data. When the ULOAD program executes the bsem instruction, the processor enters Secure Execution mode. Interrupts are masked, the SEF 54 is set, the Secure Port 52 is enabled and instruction fetch begins at location zero of the Secure Buffer 40, which is the entry point for the EPLAY program. The CPU fetches instructions from the Secure Buffer 40 over the Decryption Bus 46, through the Secure Port 52. The CPU sets the SLR 42 to the desired address in the Secure Buffer 40 for storing the decrypted multimedia data. The EPLAY program instructs the CPU to read encrypted multimedia data from main memory and write it over the Decryption Bus 46 to the DES decryption unit 38. The DES decryption unit 38 decrypts the data and stores it in the Secure Buffer 40 at the address specified by the SLR 42. The EPLAY program reads the multimedia data from the Secure Buffer 40, decompresses it, and loads it into the framebuffer 48 for display by the display unit 50.

The EPLAY program can be trusted with the decrypted, but still compressed, multimedia data. Since the EPLAY program is encrypted before transmission by the publisher, any attempt to tamper with it along the way will render it inoperative. The EPLAY program is loaded directly into the Secure Buffer 40 as it is decrypted, so it is protected as it is being decrypted and while it is executing. The EPLAY program is in complete control of the processor. Interrupts are masked as the process enters Secure Execution mode, so the EPLAY program cannot be forced to relinquish control. A non-maskable interrupt or hardware reset will clear the SEF 54 and the SLF 56, making the Secure Buffer 40 inaccessible. The EPLAY program has the option of saving its state and then executing the esem instruction to return to the ULOAD program. This will re-enable interrupts and allow other tasks to run on the processor. Executing the esem instruction clears the SEF 54, making the Secure Buffer 40 inaccessible. The EPLAY program can be re-entered by executing the bsem instruction again. Once again, instruction fetch begins at location zero of the Secure Buffer 40, but in this case the EPLAY program will determine that it is resuming, rather than starting, execution. The EPLAY program will then restore its previously saved state and continue its decompression activities.

An attempt to read part of the contents of the Secure Buffer 40 by loading a small "hacker" EPLAY program will fail. While the processor is in normal mode, the Secure buffer 40 can only be loaded under the control of the decryption logic. The complete sequence of lrsa, drsa, and ddes instructions must be performed to set the SLF 56, which has the effect of writing over the previous contents of the Secure Buffer 40. The hacker does not know the DES key, so modifying the EPLAY program before it is loaded is also not feasible.

The compressed data remains within the Secure Buffer 40, safe from all authorized and unauthorized users. Thus, the compressed data cannot be pirated.

At the first address of the Secure Buffer 40 is the first instruction for the EPLAY program. Running the EPLAY program, the CPU 44 decompresses the data stored in the Secure Buffer 40. If the architecture of the CPU 44 is based on an MMX-enabled "Pentium" processor, it has 64-bit registers and an instruction set that includes instructions for the 64-bit registers. The MMX-related instructions are designed to speed processing of multimedia-related functions such as MPEG decompression. For example, an ADD operation in an MMX-enabled CPU causes eight bytes of data to be packed into the 64-bit register and added in parallel. Eight additions can be performed in a single clock cycle. The architecture of the CPU 44 could also be based on a RISC-based processor that is augmented with instructions supporting multimedia operations such as MPEG compression and decompression, graphics rendering, and signal processing. Although more expensive, the RISC-based processors are more powerful than the MMX-enabled Pentium processors and can perform compression and decompression at greater speeds.

If, however, the architecture of the CPU 44 is based on the "Power PC" processor, which is not optimized for performing multimedia operations, it can be enabled with multimedia instruction set extensions in addition to the decryption instruction set extensions. The superscalar "PowerPC" processor has thirty-two 32-bit General Purpose Registers (GPR) and thirty-two 64-bit Floating Point Registers (FPR). The following multimedia instructions could form the multimedia instruction set extensions:

mmulb Four 16-bit by 8-bit multiplies.
        MRA)×(MRB)=>MRT
    mmulh Two 16-bit by 16-bit multiplies.
    (MRA)×(MRB)=>MRT
    maddb Four 16-bit additions. (MRA)+(MRB)=>MRT
    msub Four 16-bit subtractions. (MRA)−(MRB)=>MRT
    mpkh Pack 16-bit half-words to 8-bit bytes
        MRA(0...15)=>MRT (0...7)
        MRA(16...31)=>MRT (8...15)
        MRA(32...47)=>MRT (16...23)
        MRA(48...63)=>MRT (24...31)
        MRB(0...15)=>MRT (32...39)
        MRB(16...31)=>MRT (40...47)
        MRB(32...47)=>MRT (48...55)
        MRB(48...63)=>MRT (56...63)
    mpkw Pack 32-bit words to 16-bit half-words
        MRA(0...31)=>MRT (0...15)
        MRA(32...63)=>MRT (16...31)
        MRB(0...31)=>MRT (32...47)
        MRB(32...63)=>MRT (48...63)
    mexb Expand/interleave bytes to 16-bit half-words
        MRA(0...7)=>MRT (0...7)
        MRB(0...7)=>MRT (8...15)
        MRA(8...15)=>MRT (16...23)
        MRB(8...15)=>MRT (24...31)
        MRA(16...23)=>MRT (32...39)
        MRB(16...23)=>MRT (40...47)
        MRA(24...31)=>MRT (48...55)
        MRB(24...31)=>MRT (56...63)
    mexh Expand/interleave half-words to 32-bit words
        MRA(0...15)=>MRT (0...15)
        MRB(0...15)=>MRT (16...31)
        MRA(16...31)=>MRT (32...47)
        MRB(16...31)=>MRT (48...63)

These multimedia instructions operate on the set of 32 registers of 64 bits each. Typically, these same registers are also used for floating point operations, but a dedicated set of registers (or tags to control access) could be used so that data could remain securely in the registers during a context switch to service interrupts.

The CPU 44 buffers the decompressed data in a frame buffer 48. The buffered data is read out of the frame buffer 48 and displayed by a display device 50 such as a video digital-to-analog converter (DAC) or an NTSC converter. Readout can be controlled internally by the CPU 44 (in which data is read out every n cycles) or externally by the display device 50 (e.g., the data is read out upon request by the display device 50).

The decode logic 30, multiplexer 32, RSA decryption unit 34, memory 36, DES decryption unit 38, Secure Buffer 40, Secure Load Register 42, CPU 44 and decryption bus 46 are constructed on a single chip using 0.25 or 0.35 CMOS technology. The private key is programmed into the memory 36 during fabrication of the chip, and all documentation concerning the private key is destroyed. The public key is included in the documentation for the chip.

One advantage of a single chip design is security. It is extremely difficult to reverse engineer a chip fabricated using submicron CMOS technology. Thus, it is extremely difficult to access the memory 36 storing the private key. Because the memory 36 can be read only by the RSA decryption unit 34, the value of the private key cannot be accessed by any user, authorized or unauthorized, and cannot be published inadvertently.

Another advantage is speed of decryption. Because the decryption bus 46 is fabricated on the same chip as the CPU 44 and the decryption units 34 and 38, decryption can be performed at the CPU's internal clock speed (e.g., 200 MHz) rather than being limited by the maximum speed (e.g., 66 MHz) of an off-chip bus.

Although a single chip design is preferred, the subscriber station 14 can be constructed on multiple chips. For example, the RSA decryption unit 34 and the DES decryption unit 38 can be off-the-shelf components. Commercial RSA and DES chips are readily available. The VM007 DES chip from VLSI Technology, for example, has a clock speed of 32 MHZ and a throughput of 200 Mbytes per second or 3.34 million DES blocks per second.

The private key memory 36 can be an EPROM, the Secure Buffer 40 can be implemented in DRAM and the Secure Load Register 42 can be implemented in SRAM. For maximum security, the private key memory 36, the Secure Buffer 40 and the Secure Load Register 42 are encapsulated in a package that cannot be removed or probed without erasing the contents.

The CPU 44 can be an off-the-shelf processor, such as an MMX-20 enabled "Pentium" processor from Intel, or a RISC-based processor that is commercially available from companies such as Sun Microsystems, Hewlett-Packard, Digital Equipment, Texas Instruments, IBM and Silicon Graphics.

Figure 3:
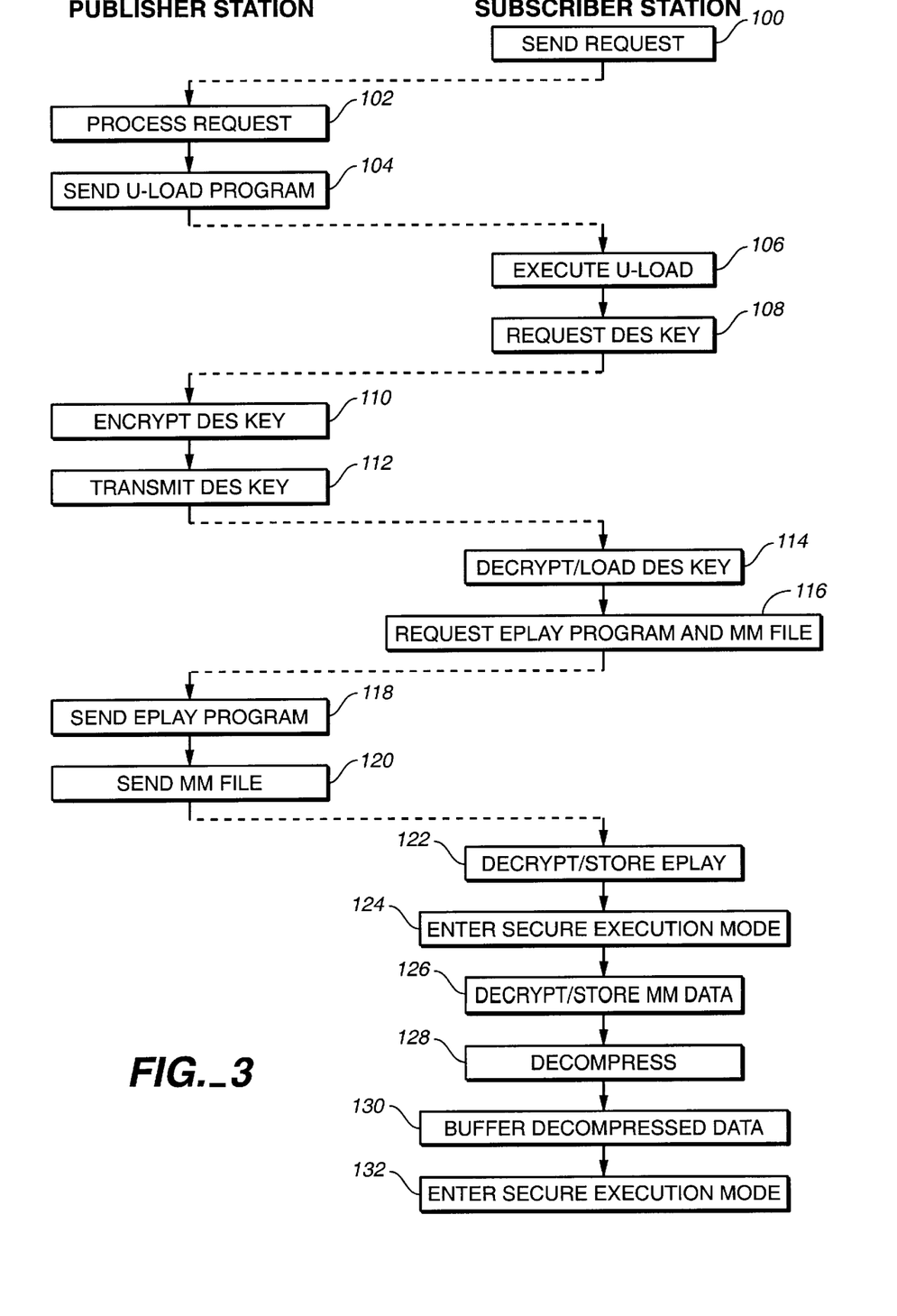
FIG. 3 is a flowchart of the operation of the system shown in FIG. 1.

FIG. 3 shows the steps performed during a typical transmission of a multimedia file from the publisher station 12 to the subscriber station 14. The subscriber station 14 requests the multimedia file, for example, by sending a request over the communications link 16 to the publisher station 12 (step 100). The request identifies the multimedia file by title or catalog number, for example. The request also includes a payment, such as a credit card number, cybercash or an authorization to charge an existing account.

The publisher station receives and processes the request from the subscriber station 14 (step 102). After the request is cleared, the publisher station 12 sends the U-LOAD program (uncompressed and unencrypted) to the subscriber station 14 (step 104).

The subscriber station 14 begins executing the U-LOAD program (step 106) and sends a request to the publisher station 12 to send the DES key (step 108). The request could include the subscriber station's RSA public key, embedded in a digital certificate traceable to the manufacturer.

The publisher station 12 encrypts its DES key with the subscriber station's public key in the key encryption module 22 (step 110) and transmits the encrypted DES key to the subscriber station 14 (step 112).

The subscriber station 14 decrypts the DES key in the RSA decryption unit 34 and loads the decrypted DES key into the DES decryption unit 38 (step 114). Then, the subscriber station 14 sends a request to the publisher station 12 to send the EPLAY program and the DES-encrypted multimedia file (step 116).

The publisher station 12 sends the encrypted EPLAY program to the subscriber station 14 (step 118), followed by the encrypted, compressed multimedia file (step 120).

The subscriber station 14 decrypts the EPLAY program and stores it in the Secure Buffer 40, starting at the first address (step 122). After the Secure Buffer 40 has ben filled, the CPU enters the Secure Execution mode (step 124). Interrupts are masked, the SEF 54 is set, the Secure Port is enabled, and the CPU 44 begins executing the EPLAY program by fetching instructions at location zero of the Secure Buffer 40. The CPU 44 reads the multimedia data from the memory 60 and writes it to the DES decryption unit 38 over the Decryption Bus 46. The DES decryption unit 38 decrypts the multimedia data and stores it in the Secure Buffer 40 (step 126). The CPU 44 compresses the block of data stored in the Secure Buffer 40 and stores the decompressed data in the framebuffer 48 (step 130) for display by the display device 50. When the Secure Buffer 40 is emptied, the CPU 44 exits the Secure Execution mode (step 132). If additional blocks of cyphertext are received from the publisher station 12, the additional blocks are decrypted by the DES decryption unit 38 and stored in the Secure Buffer 40. The CPU 44 re-enters the Secure Execution mode and decompresses the blocks in the Secure Buffer 40.

Throughout decryption and decompression, the integrity and security of the decompression software and the compressed multimedia file is maintained because access to the Secure Buffer 40 is linked to a particular DES key. Only the decompressed data is accessible outside of the subscriber station 14.

The architecture of the subscriber station 14 can be modified in a variety of ways. Several modifications are shown in FIGS. 4 through 6.

Figure 4:
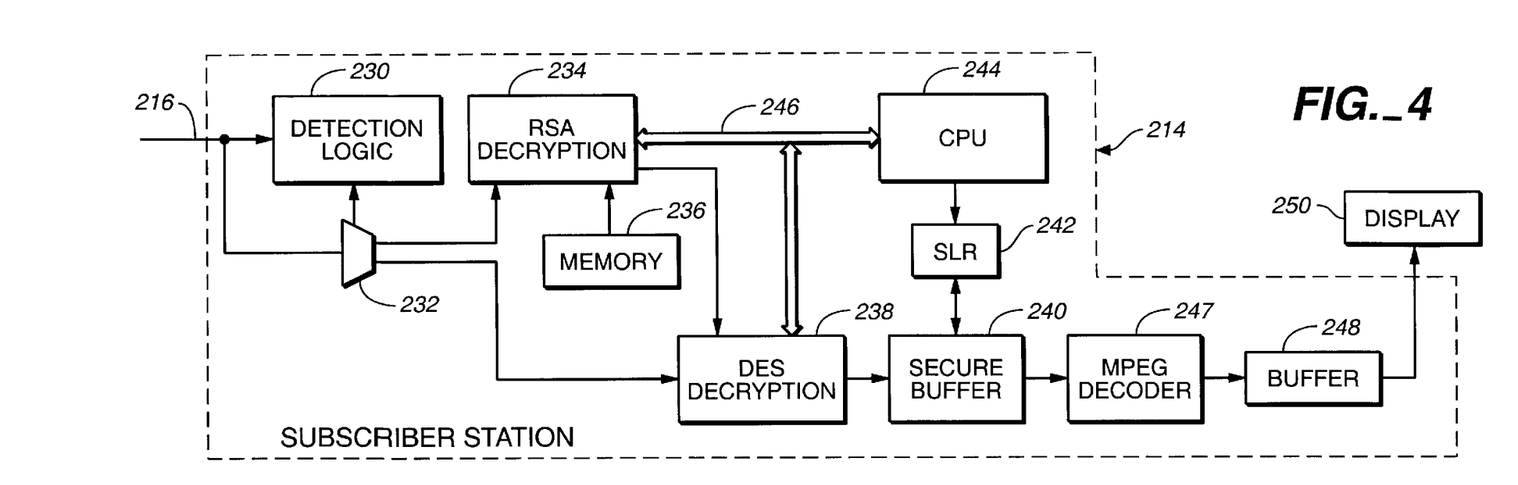
FIG. 4 is a block diagram of another subscriber station according to the present invention.

FIG. 4 shows a subscriber station 214 including detection logic 228, a multiplexer 230, a FIFO buffer 232, an RSA decryption unit 234, memory 236 for storing an RSA private key, a DES decryption unit 238, a Secure Buffer 240, a Secure Load Register 242, a CPU 244, a decryption bus 246 and an MPEG decoder 247. Decryption of the DES key and incoming data is performed as described above. However, decompression is performed by the MPEG decoder 247 instead of the CPU 244. The CPU 244 causes the Secure Buffer 240 to read out blocks of compressed data to the MPEG decoder 247. Decompressed data from the MPEG decoder 247 is buffered in a frame buffer 248 and presented by a display device 250. A single-chip implementation for the subscriber station 214 is preferred.

Figure 5:
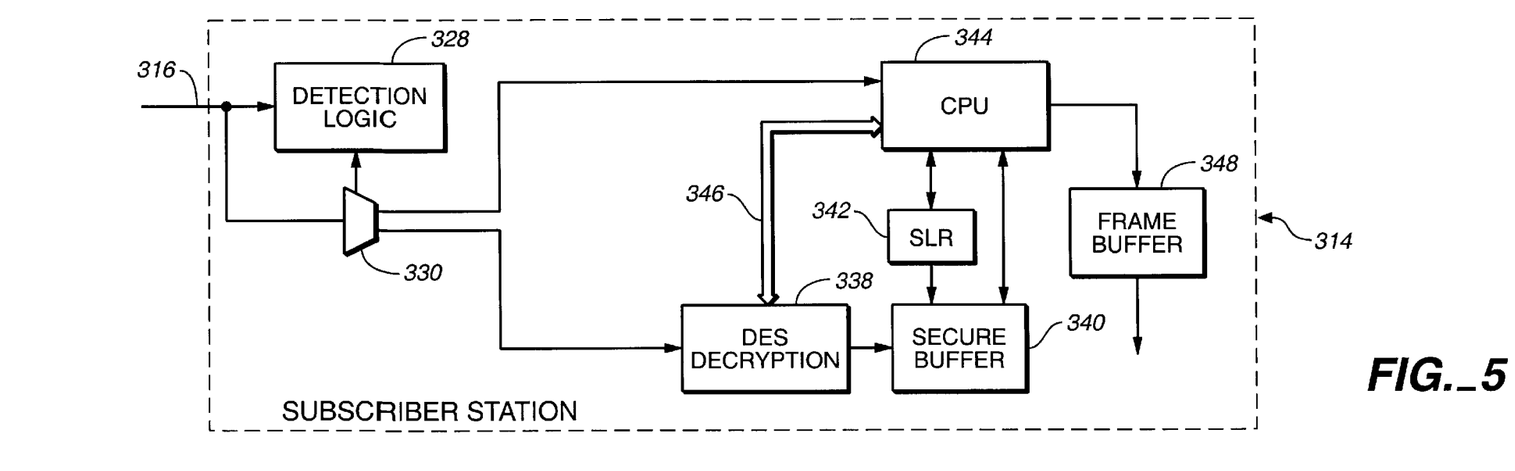
FIG. 5 is a block diagram of yet another subscriber station according to the present invention.
Figure 6:
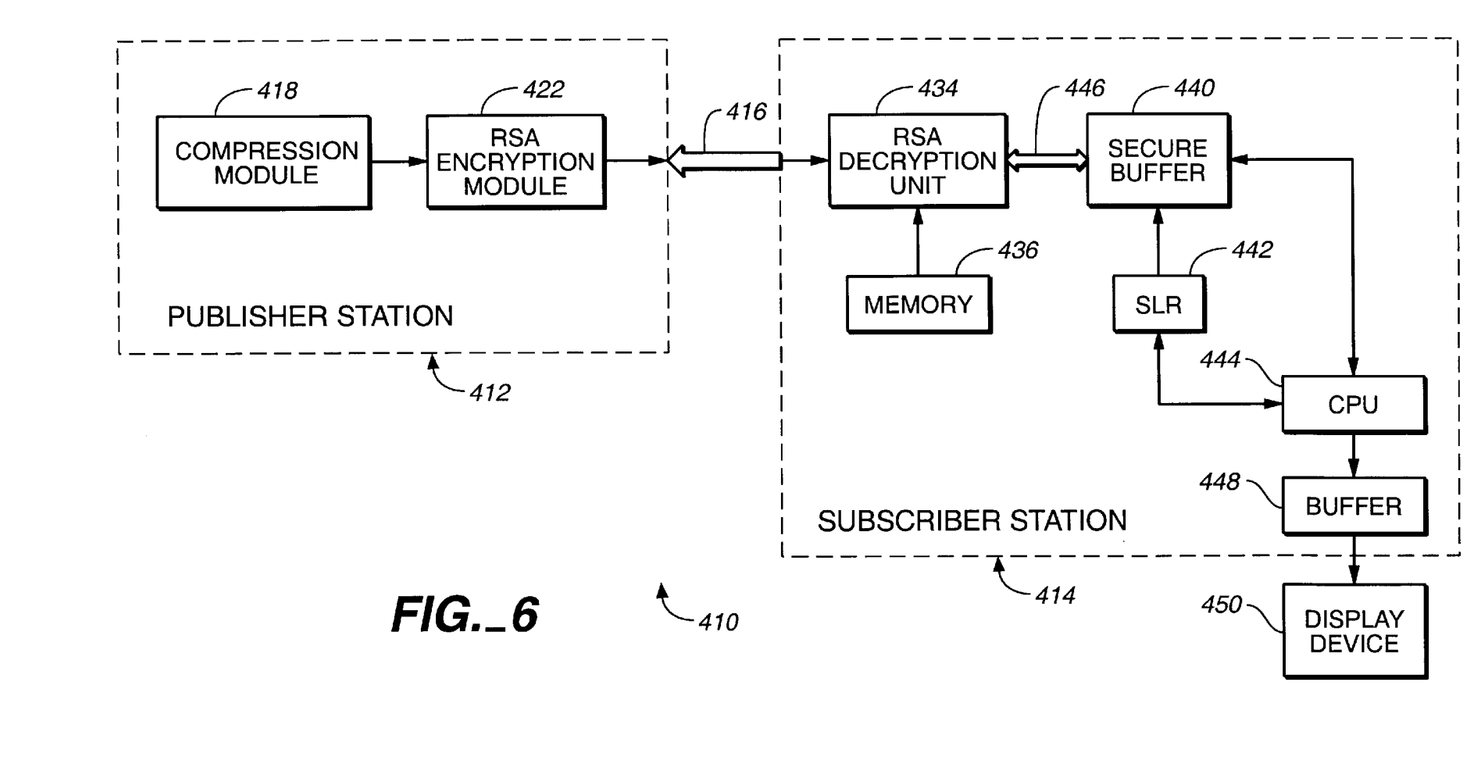
FIG. 6 is a block diagram of still another subscriber station according to the present invention.

FIG. 5 shows a subscriber station 314 including detection logic 328, a multiplexer 330, a FIFO buffer 332, a DES decryption unit 338 a Secure Buffer 340, a Secure Load Register 342, a CPU 344, a decryption bus 346, and a frame buffer 348. The subscriber station 314 decrypts and decompresses data in the same manner as the subscriber station 14 shown in FIG. 1. However, the CPU 344 also performs RSA decryption. Performing RSA decryption in software instead of hardware eliminates the need for an RSA encryption unit and thereby lowers the cost of the subscriber station 314. Yet only a slight increase in processing time results since RSA decryption is performed only once (on the DES key).

The CPU 344 can have a custom RISC-based design using LSI Logic's MiniRISC family of microprocessors, scalable processors that are user-defined. Three members of the MiniRISC R4000CPU Core Family are the CW4001, the CW4010 and the CW4100. These members are targeted at low-power, high-performance embedded applications. The MiniRISC family is scalable from 25 to 250 MIPS and is instruction set-compatible. The CPU 344 can be designed from a MiniRISC core, customer-specific logic and Core-Ware™ methodology from LSI Logic. The CPU 344 can be realized by a CW4001 microprocessor and the RSA encryption unit can be realized by a custom floating-point unit (FPU). The CPU's L2 cache could even be used as the Secure Buffer 340, which would eliminate the additional hardware. Here too, a single-chip implementation for the subscriber station 314 is preferred.

FIG. 6 shows a digital communications system 410 that uses only public key encryption and decryption. A subscriber station 414 makes a request for data and publishes its public key. A publisher station 412 receives the request and reads the public key, compresses the requested data in a compression module 418, and encrypts the compressed data with the public key in an RSA encryption module 422. The encrypted data is sent to the subscriber station 414 over the communications link 416.

The subscriber station 416 includes an RSA decryption unit 434 which, under control from a CPU 444, decrypts the blocks using a private key. The private key is stored in memory 436 that can only be accessed by the RSA decryption unit 434. The decrypted, compressed data is stored in a Secure Buffer 440 and decompressed by the CPU 444. The decompressed data is stored in a frame buffer 448 for presentation by a display device 450. This subscriber station 414, which eliminates the need for a DES decryption unit, is best suited for transmissions where processing speed is not important. As with the embodiments above, a single-chip implementation for the subscriber station 414 is preferred.

Thus disclosed is a digital communications system that provides for the secure transmission of data. The subscriber station provides security by preventing the compressed data from being accessed. Only the uncompressed data, which is not economical to distribute, can be accessed.

A single-chip design prevents the decryption key from being accessed by an unauthorized user or published inadvertently. The single-chip design also allows for decryption to be performed at high speeds.

A few additional instructions and a modest amount of logic allow a processor such as the "PowerPC" to operate at a significantly higher level of performance than a general purpose processor alone.

In addition to distributing software and multimedia content, the system according to the present invention is especially useful for digital commerce. For example, a financial institution can verify a transaction by using authentication protocols based on the private key in the subscriber station. Or, a publisher can examine the subscriber's public key as a way of exercising control over the distribution of his software. The publisher would send the compressed data only to those parties having the appropriate public keys, making the software effectively "tamperproof." However, the system is not limited to such use.

There is no limitation as to how the subscriber station can be packaged. A system level product might include single-chip modules often having other electrical components such as capacitors; multichip modules having two or more integrated circuits (with or without other electrical components); board level products such as those having multiple integrated circuits on a resin or other substrate board; and box level products including combinations of elements such as single-chip modules, multi-chip modules, board-level products, or other devices.

It is understood that additional changes and modifications may be made without departing from the spirit and scope of the invention. Accordingly, the present invention is not limited to the precise embodiment described hereinabove. Instead, it is defined by the claims that follow.

We claim:

1. A subscriber station for processing incoming data that has been encrypted and compressed, comprising:
    decryption means for decrypting the incoming data;
    a buffer for storing the decrypted, compressed data from the decryption means;
    decompression means for decompressing the data in the buffer; and
    means for making the compressed data accessible only to the decompression means when a decompression is being performed by the decompression means.

2. The subscriber station of claim 1, wherein the decompression means includes a CISC-based microprocessor.

3. The subscriber station of claim 1, wherein the decompression means includes a RISC-based microprocessor.

4. The subscriber station of claim 3, wherein the microprocessor is provided with multimedia instruction set extensions for performing the decompression.

5. The subscriber station of claim 1, further comprising security instruction set extensions for performing decryption.

6. The subscriber station of claim 1, wherein the decompression means includes a central processing unit that is programmable with a decompression program to decompress the data in the buffer, and wherein the decompression program is also stored in the buffer.

7. The subscriber station of claim 6, wherein the decryption means includes a public key decryption unit and memory for storing a private key for the public key decryption unit, the key being embedded in the memory.

8. The subscriber station of claim 7, wherein the decryption means further includes a DES decryption unit for decrypting the incoming data, the private key decryption unit decrypting an encrypted DES key that comes to the subscriber station prior to the incoming data.

9. The subscriber station of claim 8, wherein the central processing unit is programmed with a start-up program that instructs the central processing unit, to decrypt the DES key, load the DES key into the DES decryption unit, decrypt the decompression program and store the decrypted decompression program in the buffer, and execute the decompression program stored in the buffer.

10. The subscriber station of claim 1, further comprising a load register for the buffer, the load register being accessible only to the decryption means when decryption is being performed, the load register being accessible only to the decompression means when decompression is being performed.

11. A digital communications chip comprising:
    decryption means for decrypting income data;
    a buffer for storing the decrypted data;
    a microprocessor for decompressing the data in the buffer, and for making the data in the buffer accessible only to the microprocessor when a decompression is being performed by the microprocessor;
    a bus for providing a communications path between the decryption means and the decompression means; and
    a private bus between the decryption means and the buffer.

12. The chip of claim 11, wherein the microprocessor is RISC-based and is provided with multimedia instruction set extensions for performing the decompression.

13. The chip of claim 11, wherein the microprocessor is provided with security instruction set extensions for performing the decryption.

14. The chip of claim 11, wherein the decryption means includes a public key decryption unit and memory for storing a private key for the public key decryption unit, the private key being embedded in the memory.

15. The chip of claim 14, wherein the decryption means further includes a DES decryption unit for decrypting the incoming data, and wherein the private key decryption unit decrypts an encrypted DES key that comes to the chip before the incoming data comes to the chip.

16. The chip of claim 11, wherein the microprocessor is programmable with a decompression program, and wherein the decompression program is stored in the buffer.

17. The chip of claim 16, wherein the decompression program is sent to the subscriber station in encrypted form, and wherein the microprocessor is programmed to decrypt the decompression program and store the decrypted decompression program in the buffer.

18. The chip of claim 11, further comprising a load register for the buffer, the load register being accessible only to the decryption means when decryption is being performed, the load register being accessible only to the microprocessor when decompression is being performed.

19. A digital communications system comprising:
    a publisher station for transmitting data over a communications link, the data including an encrypted decompression program, an encrypted DES key and at least one encrypted, compressed file; and
    a subscriber station for receiving the data on the communications link, the subscriber station comprising decryption means for decrypting the decompression program, the DES key and the at least one file; a buffer for storing the decrypted files; and a microprocessor for decompressing the files in the buffer; and means for making the files in the buffer accessible only to the microprocessor when a decompression is being performed by the microprocessor.

20. The system of claim 19, wherein the microprocessor is programmable with a decompression program, and wherein the decompression program is stored in the buffer.

21. The system or claim 19, further including a start-up program for instructing the subscriber station to decrypt the DES key, decrypt the decompression program with the DES key and store the decrypted decompression program in the buffer, and decrypt the at least one file and store the decrypted at least one file in the buffer, the start-up program being sent to the subscriber station by the publisher station.

22. The system of claim 21, wherein the subscriber station makes a request for the DES key after the start-up program has been loaded into the microprocessor.

23. The system of claim 21, wherein the subscriber station makes a request for the decompression program and the at least one file after the DES key has been loaded into the decryption means.

* * * * *